Patented Jan. 24, 1933

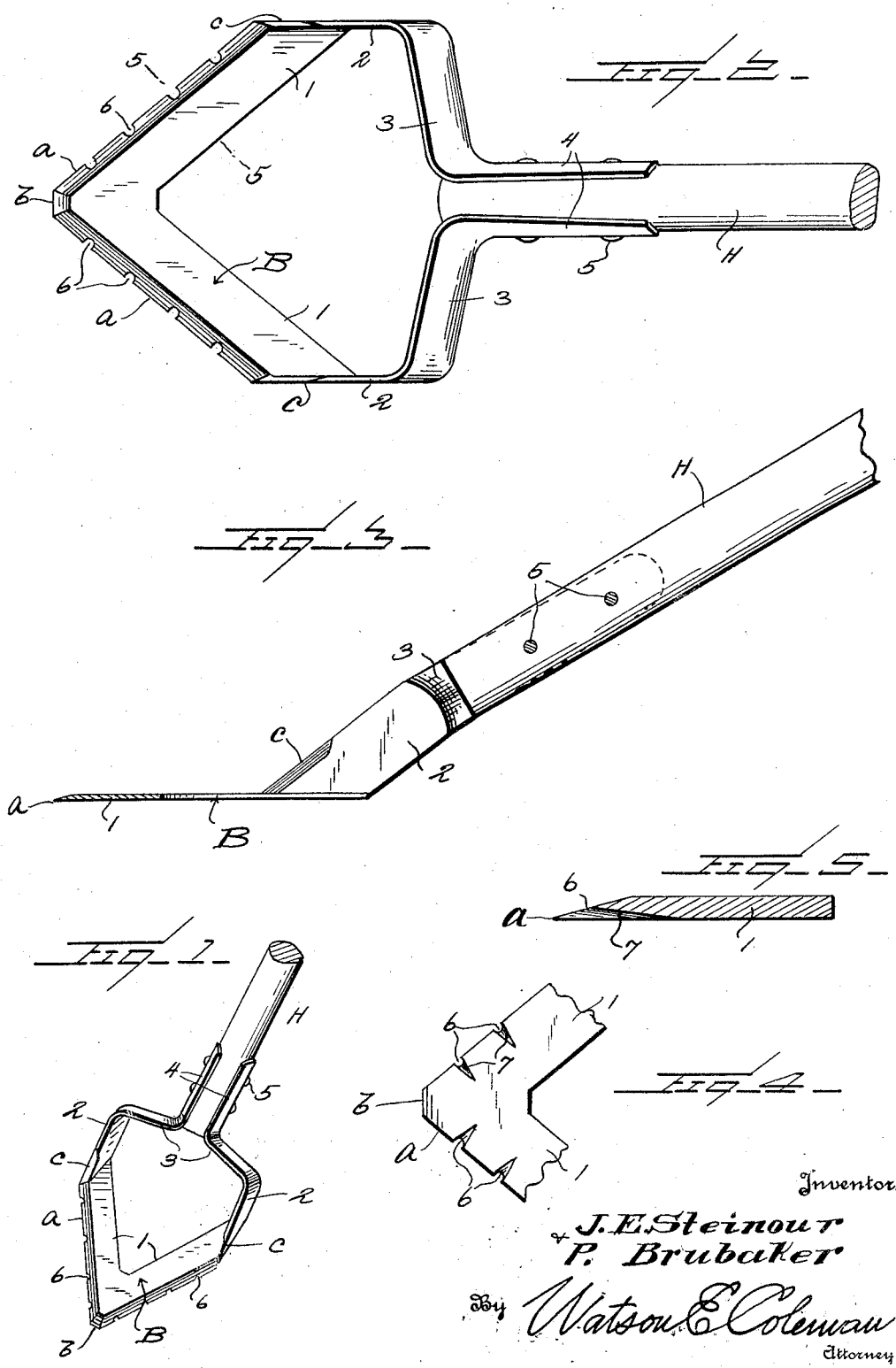

1,895,055

UNITED STATES PATENT OFFICE

JOHN E. STEINOUR AND PETER BRUBAKER, OF LOS ANGELES, CALIFORNIA

PUSH HOE

Application filed June 9, 1931. Serial No. 543,165.

This invention relates to a push hoe, and it is an object of the invention to provide a device of this kind constructed in a manner to enable it to be employed with facility in the garden for light spading, cultivating, weeding, and pulverizing and which can be employed in connection with a lawn for trimming, edging, picking weeds and dressing around shrubs.

It is also an object of the invention to provide a device of this kind comprising a cutting blade having notches or recesses in the cutting edges thereof to facilitate the cutting action thereof, and which serve to maintain the cutting efficiency of the blade even though the edges between the recesses become dull.

Another object of the invention is to provide a device of this kind embodying blades having recesses in the cutting edge portions thereof, said recesses being so formed to prevent their efficiency being impaired by stones or the like and wherein said recesses are continued by corrugations extending within the under surfaces of the blades to further facilitate their functioning.

The invention consists in the details of construction and in the combination and arrangement of the several parts of our improved push hoe whereby certain important advantages are attained and the device rendered simpler, less expensive and otherwise more convenient and advantageous for use, as will be hereinafter more fully set forth.

The novel features of our invention will hereinafter be definitely claimed.

In order that our invention may be the better understood, we will now proceed to describe the same with reference to the accompanying drawing, wherein:—

Figure 1 is a view in perspective of a push hoe constructed in accordance with an embodiment of our invention, the handle member being shown in fragment;

Figure 2 is a view in top plan of the hoe as illustrated in Figure 1;

Figure 3 is a longitudinal section taken through the device as illustrated in Figure 2 with the handle member in elevation;

Figure 4 is a fragmentary view from below of the forward or point end portion of the hoe blade as herein disclosed;

Figure 5 is a detailed sectional view taken substantially on the line 5—5 of Figure 2.

As disclosed in the accompanying drawing, our improved hoe comprises a V-shaped cutting blade B, the apex portion of which being forwardly disposed. The diverging arms 1 of the blade are coplanar and arranged on an acute angle one with respect to the other. The forward marginal portions of the blade B are formed to provide the cutting edges $a$ and the forward or apex portion $b$ of the blade is blunt to provide a pronounced substantially straight edge.

The rear portions of the arms 1 of the blade are continued by the upwardly and rearwardly disposed side arms 2, the flat portions of which being substantially at right angles to the flat faces of the arms 1. These arms 2 are substantially in parallel and extend entirely across the outer ends of the arms 1. The knife edges $a$ continue, as at $c$, a slight distance upwardly of the arms 2.

The arms 2 are continued by the inwardly disposed arms 3 terminating in the parallel arms 4. The arms 4 receive therebetween an end portion of a handle member H, and said arms 4 and handle member H are securely connected by rivets 5 or the like. Each of the arms 4 is arcuate in cross section to assure close contact of the arms with the handle member, and we also find it of advantage to have the arms 3 arcuate in cross section to assure such arms possessing a maximum of strength.

The cutting edges $a$ are provided at desired points therearound with the recesses 6 which are relatively small and each of these recesses 6 is continued by a corrugation 7 produced in the under surface of an arm 1 and terminating a material distance inwardly from the cutting edge $a$. The base of this corrugation 7 is inclined lengthwise toward the under surface proper of the arm 1. The recesses 6 are spaced apart in a direction lengthwise of the adjacent cutting edge $a$ and adjacent recesses 6 are spaced apart a distance materially greater than the major width of a recess whereby an effective cutting edge $a$ is assured between the recesses.

The handle member H is of a length to permit the hoe to be employed with the operator in a substantially normal upright posture and with the blade B, and more particularly the arms 1 thereof, lying substantially flat upon the soil. This permits an effective cutivation of a flower garden and in a manner permitting working close up to a plant. The device can also be employed in a garden for light spading or for weeding wide and narrow places and can be employed with equal facility in connection with a lawn for trimming or edging the same, for picking weeds, dressing around shrubs or pulverizing. It is believed to be clearly understood from the foregoing description and the accompanying drawing that the blade B is formed in a manner to assure a drawing cut as the blade is pushed ahead.

This action of the blade B is facilitated by the recesses 6 and corrugations 7 while the blunt end $b$ of the blade permits the hoe to strike squarely a large weed or the like and also to cut dandelions, foxtail or the like out of the lawn or garden without unduly cutting the grass or plants.

It is to be particularly mentioned that the arms 2 are of such length to provide effective clearance for dirt and trash to move back over the hoe and through the resultant opening afforded by the arms 2 and 3.

It is to be noted that the recesses 6 will keep sharp even though the portions of the knife edges therebetween become dull. This is mainly due to the fact that these recesses are of such size to prevent stones or the like from dulling the edges of the recesses. This is also true of the corrugation 7. The provision of the recesses 6 and the corrugation 7 which are produced in the arms 1 of the blade B before the usual cyaniding, serve to make the tool more serviceable and to increase its life.

From the foregoing description it is thought to be obvious that a push hoe constructed in accordance with our invention is particularly well adapted for use by reason of the convenience and facility with which it may be assembled and operated, and it will also be obvious that our invention is susceptible of some change and modification without departing from the principles and spirit thereof and for this reason we do not wish to be understood as limiting ourselves to the precise arrangement and formation of the several parts herein shown in carrying out our invention in practice except as hereinafter claimed.

We claim:—

1. A ground working implement comprising a blade, a marginal portion of which being formed into a knife edge, said knife edge having recesses formed therein, the under surface of the blade having corrugations leading from the recesses, said recesses being spaced apart in a direction along each cutting edge, adjacent recesses being spaced apart a distance materially greater than the major width of a recess to provide a material cutting edge between each adjacent recess.

2. A ground working implement comprising a blade, a marginal portion of which being formed into a knife edge, said knife edge having recesses formed therein, the under surface of the blade having corrugations leading from the recesses, the bottoms of the recesses being inclined toward the bottom surface of the blade, said recesses being spaced apart in a direction along each cutting edge, adjacent recesses being spaced apart a distance materially greater than the major width of a recess to provide a material cutting edge between each adjacent recess.

In testimony whereof we hereunto affix our signatures.

JOHN E. STEINOUR.
PETER BRUBAKER.